Figure 5:
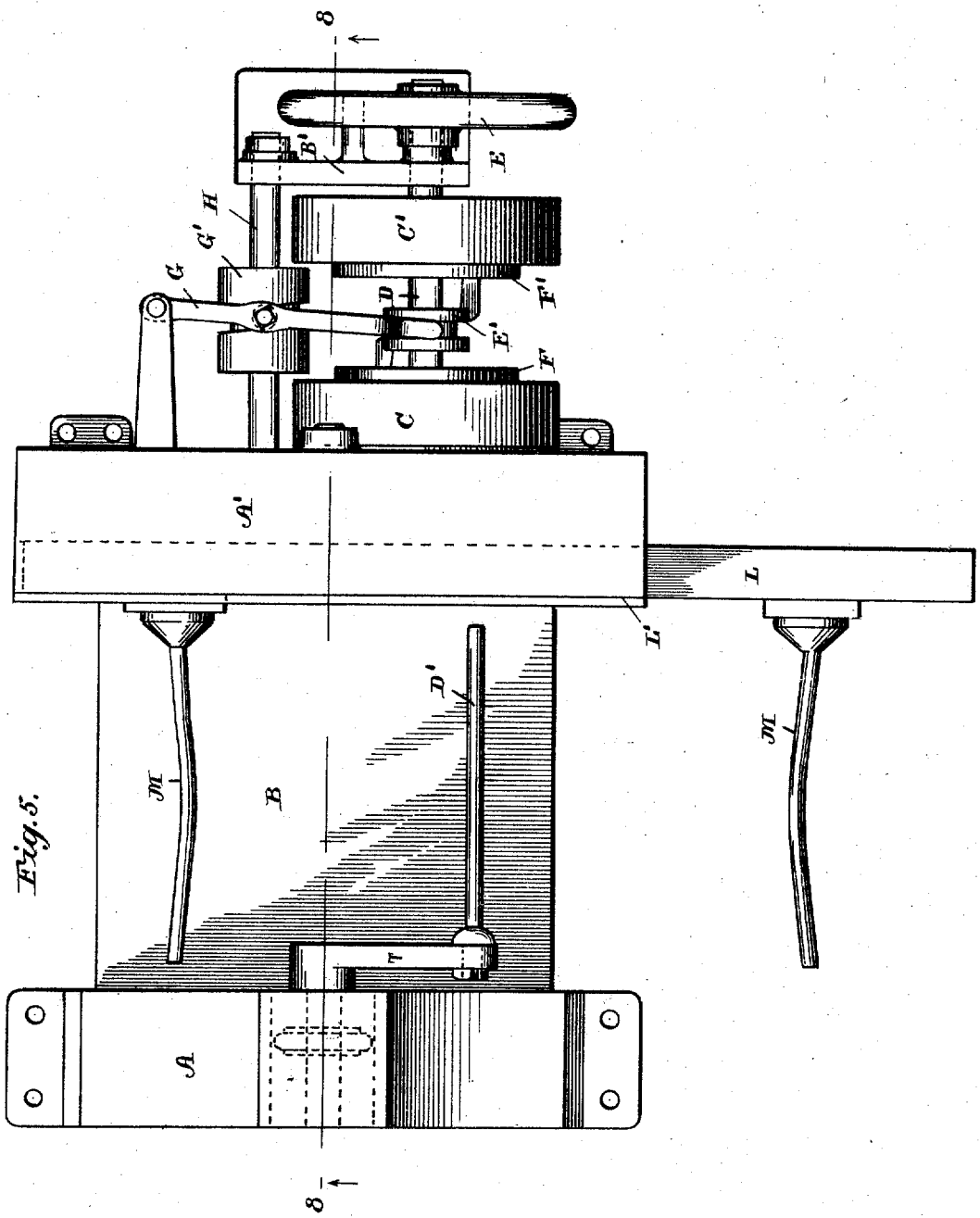

No. 767,143. PATENTED AUG. 9, 1904.
G. M. GRISWOLD.
CANDY PULLING MACHINE.
APPLICATION FILED APR. 23, 1904.
NO MODEL. 5 SHEETS—SHEET 1.
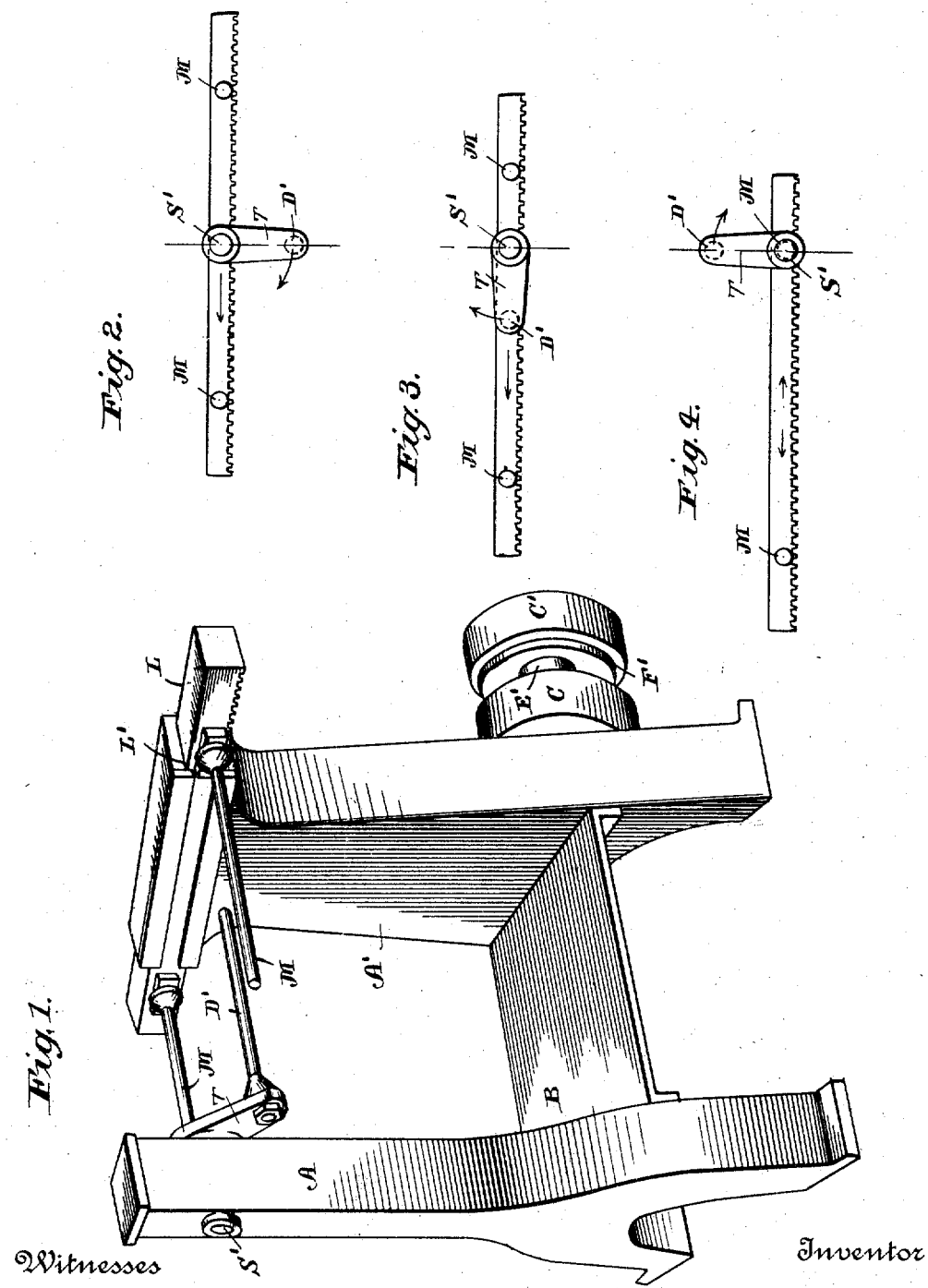

No. 767,143. PATENTED AUG. 9, 1904.
G. M. GRISWOLD.
CANDY PULLING MACHINE.
APPLICATION FILED APR. 23, 1904.
NO MODEL. 5 SHEETS—SHEET 2.

Witnesses
William V. Devitt
Edward K. Nicholson

Inventor
George M. Griswold
By Chamberlain & Newman
Attorneys

No. 767,143. PATENTED AUG. 9, 1904.
G. M. GRISWOLD.
CANDY PULLING MACHINE.
APPLICATION FILED APR. 23, 1904.
NO MODEL. 5 SHEETS—SHEET 3.
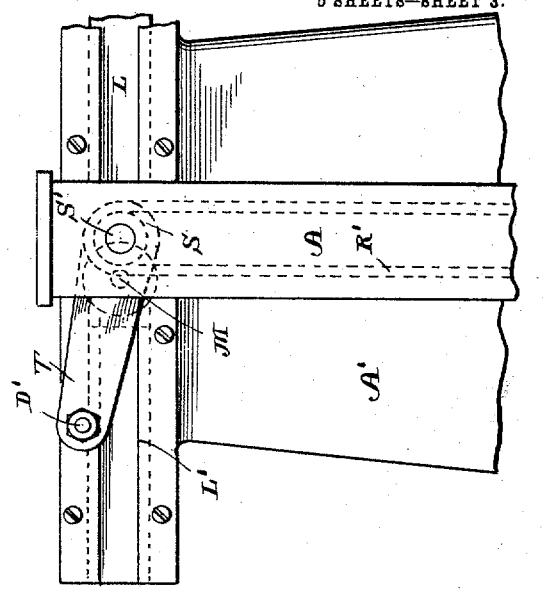
Fig. 7.
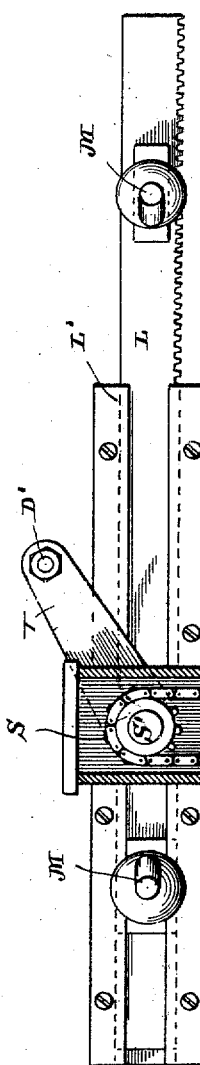
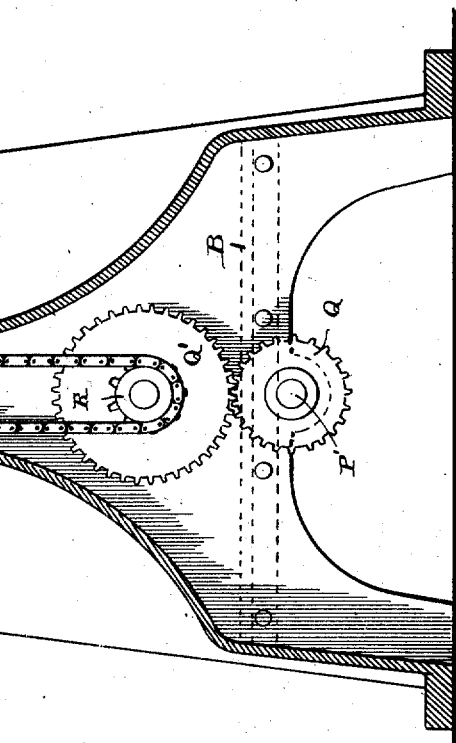
Fig. 6.
Witnesses
William V. Devitt
Edward K. Nicholson
Inventor
George M. Griswold
By Chamberlain & Newman
Attorneys

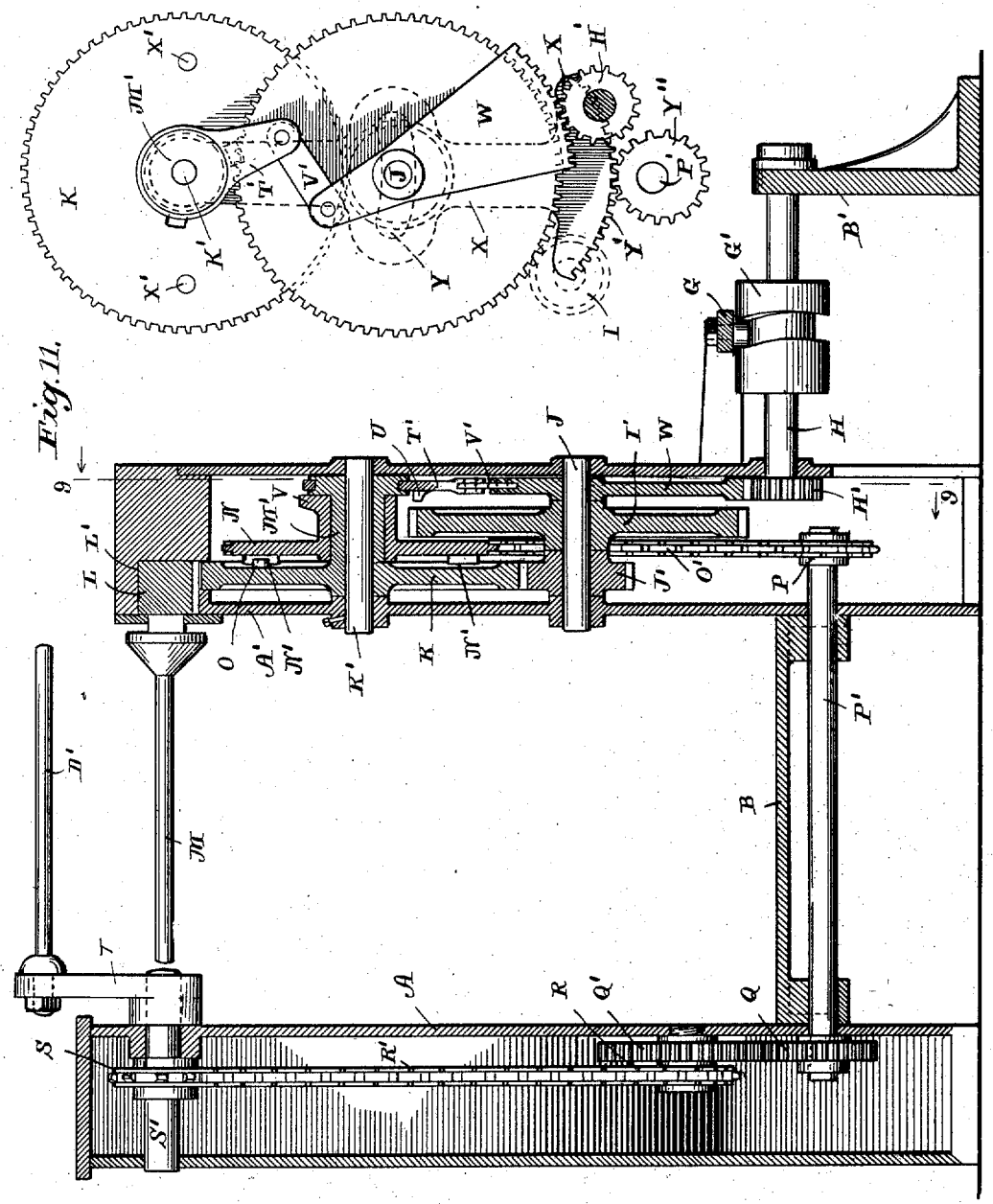

No. 767,143. PATENTED AUG. 9, 1904.
G. M. GRISWOLD.
CANDY PULLING MACHINE.
APPLICATION FILED APR. 23, 1904.
NO MODEL. 5 SHEETS—SHEET 5.
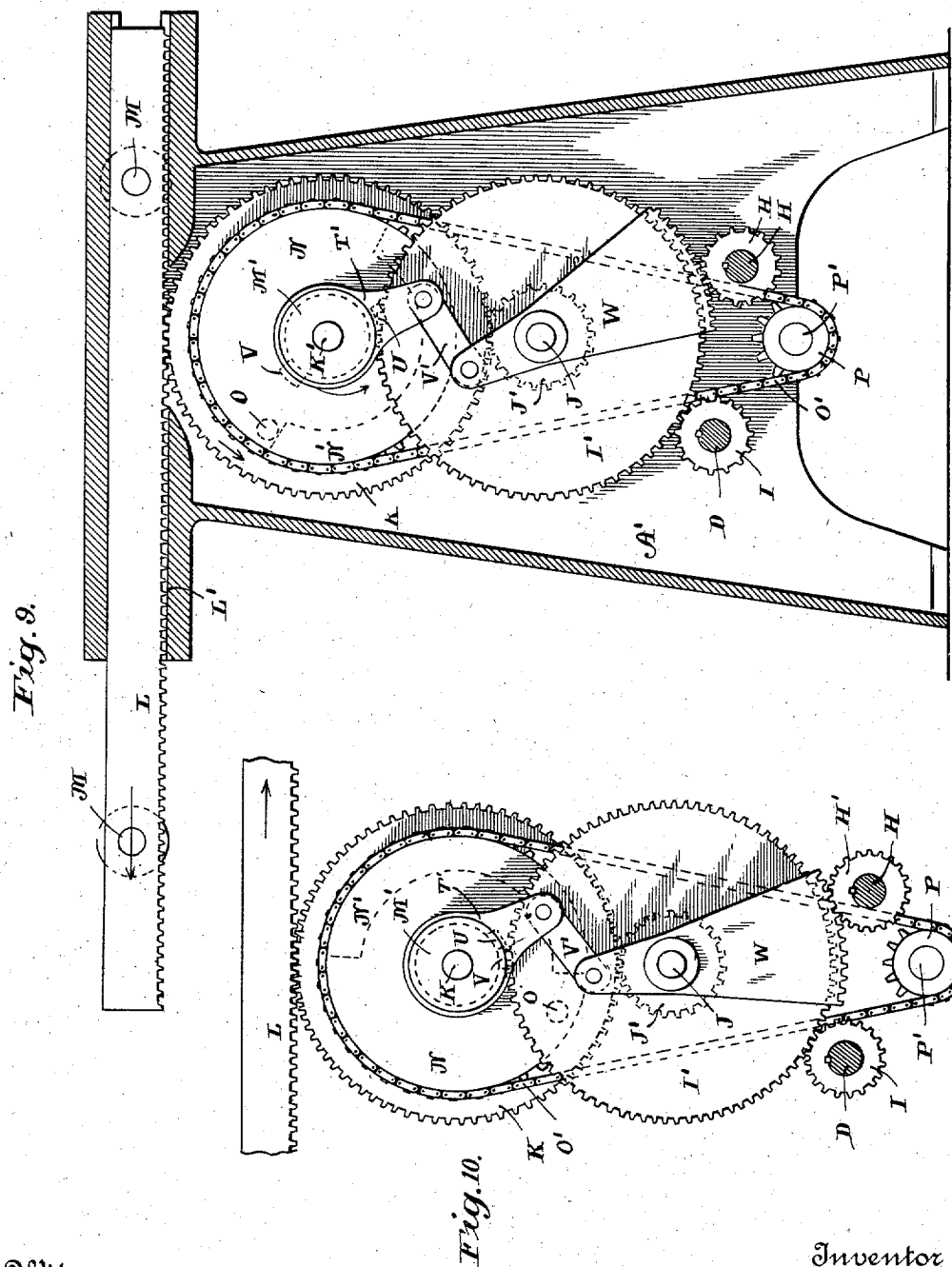
Witnesses
William V. Devitt
Edward K. Nicholson
Inventor
George M. Griswold
By Chamberlain & Newman
Attorneys No. 767,143. Patented August 9, 1904.

UNITED STATES PATENT OFFICE.

GEORGE M. GRISWOLD, OF NEW HAVEN, CONNECTICUT, ASSIGNOR OF TWO-THIRDS TO ANDREW R. BRADLEY AND GEORGE P. SMITH, OF NEW HAVEN, CONNECTICUT.

CANDY-PULLING MACHINE.

SPECIFICATION forming part of Letters Patent No. 767,143, dated August 9, 1904.

Application filed April 23, 1904. Serial No. 204,594. (No model.)

*To all whom it may concern:*

Be it known that I, GEORGE M. GRISWOLD, a citizen of the United States, and a resident of New Haven, in the county of New Haven and State of Connecticut, have invented certain new and useful Improvements in Candy-Pulling Machines, of which the following is a specification.

My invention relates to new and useful improvements in candy-pulling machines such as are used in the manufacturing of taffy candies and employed for working the same from a soft to a comparatively hard state.

It is the object of my invention to improve upon machines of this class by producing a construction which will be simple and light in operation yet strong and especially powerful at the points of operation where the most power is required and to provide a machine which in its operation is not liable to drop the candy, but if it should to pick it up again and proceed with the pulling operations until the candy is finished, thus operating without the constant attention of an attendant.

Briefly, my machine comprises a suitable frame carrying a slide provided with driving mechanism to reciprocate the same to and fro. Said slide carries a pair of pegs, one adjacent to each end and both designed to travel in the same horizontal path. A third peg is mounted upon a crank adapted to alternately revolve around said pegs of the slide in a manner to throw the loop of candy over each of said pegs as they respectively reach the end of their movements.

With the above objects in view my invention resides and consists in the novel construction and arrangements of parts shown upon the accompanying five sheets of drawings, forming a part of this specification, upon which similar characters of reference denote like or corresponding parts throughout the several figures, and of which—

Figure 1 shows a perspective view of my machine. Figs. 2, 3, and 4 show diagram views of the relative positions which the pulling-pegs assume in the course of operation and from which it will be observed that two of these pegs travel horizontally and that the third revolves around a fixed center to throw the candy alternately over each of the horizontally-moving pegs. Fig. 5 is a plan view of my machine complete. Fig. 6 shows a sectional end elevation of my machine. Fig. 7 is a detail of said end, showing, the slide and crank in a different position. Fig. 8 is a central vertical longitudinal section taken on line 8 8 of Fig. 5. Fig. 9 is a vertical section taken on line 9 9 of Fig. 8, illustrating the mechanism for reciprocating the slide. Fig. 10 is a detail illustrating the same mechanism, but in a different position. Fig. 11 illustrates a slightly-modified construction for operating the slide and pegs which includes a segment in lieu of the sprocket-chain connection.

Referring in detail to the characters of reference marked upon the drawings, it will be seen that the frame of my machine is formed in several parts, comprising end uprights A and A', bearing an intervening table B, which is bolted to said uprights in a way to rigidly tie them together. Each of these uprights A and A' are constructed in the form of a casing, one adapted to inclose the mechanism for reciprocating the slide and the other the mechanism for operating the crank-arm and its peg D'.

The machine is preferably operated from a counter-shaft by direct and crossed belts, (not shown,) that drive the clutch-pulleys C and C' in opposite directions. These pulleys are obviously loosely mounted upon shaft D, one end of which is journaled in the casing A' and the other in a bracket B', secured to the floor. This shaft is further provided with a balancing-wheel E, and a clutch-sleeve E' is slidably keyed to said shaft intermediate of the two pulleys and is adapted to be shifted to cause the engagement of either the clutch member F or F' with the respective clutch-faces of the pulleys C and C' in a way to drive the shaft to either the right or left. This clutch-sleeve is automatically operated through a lever connection G with the cam G', mounted on the shaft H, said shaft being journaled at one end in the bracket B', before mentioned, and its other end in the upright A' and bears a pinion H' within the said upright operated by connections which will later be described.

The driving-shaft D bears a small pinion I within the upright A', that meshes with a large gear I', secured to the shaft J, journaled in the upright and bearing a small gear J', that meshes with a third and large gear K, loosely journaled upon a fixed shaft K', secured within said upright, as clearly appears in Fig. 8. This third gear K engages a toothed rack of the slide L, which rack and slide are mounted to reciprocate in a horizontal way L' of the upright A'. The inside of this way is open in a manner to permit a reciprocating movement of the pegs M with the slide, as is obviously necessary. From the foregoing description it will be seen that the slide referred to is reciprocated crosswise to and fro in its ways by means of the clutch mechanism and automatic connections for operating the same, as will later be described.

The third peg D', which manipulates the candy, as previously stated, is designed in a way to operate intermittently, normally resting in its lowered position, as indicated in Fig. 2, and is further designed to move up intermediate of the pegs M of the slide and down alternately on the outside of each of them respectively, thus picking the candy up intermediate of its web and alternately throwing it over each of the pegs M, respectively. This third or revolving peg is driven from the main shaft D through part of the connection previously described, as will now be referred to in detail. Upon the hub M' of the gear K is mounted a sprocket-wheel N, bearing a plate N', secured to its inner side. (See Figs. 8, 9, and 10.) The opposite ends of this plate are designed to be alternately engaged by the pin O, secured to the gear K in a way to be alternately turned slightly with the final rotary movement of said gear and just prior to its reversing. Thus it will be seen that only a rocking movement is imparted to the sprocket, which movement, however, being imparted by a chain O' to a smaller sprocket P turns its shaft P' substantially a complete rotation. To the opposite end of the shaft P' is secured a gear Q, that meshes with and drives a second gear Q', mounted upon a stud and bearing a sprocket R, connected by the chain R' to an upper sprocket S, secured to a shaft S', that bears a crank-arm T, which carries a peg D'. This train of mechanism therefore imparts to the peg D' the revolving movement described, which takes place around the two pegs of the slide alternately when the same are brought up in substantially a line with the center of axis of the revolving movement of said third peg.

The connections for the clutch-shifting mechanism are preferably made with the gear-wheel K and the large sprocket-wheel N, as will be seen from Figs. 8, 9, and 10, and consists in mounting an arm T' in a suitable groove in the sleeve of the gear K. This arm is provided with a lug U, the opposite sides of which are alternately engaged by the lug V upon the hub of the sprocket-wheel N. This latter lug moves with said sprocket and engages the lug U of the arm in a way to move the same alternately to the right and left, as will be apparent from Figs. 9 and 10, and at the instant the slide reaches the end of its stroke. The arm T' is provided with a link V', connecting the same with the segmental arm W, loosely mounted upon the shaft J and bearing a rack in engagement with the gear H' of the cam-shaft H', before described. This train of mechanism will obviously shift the clutch mechanism automatically at the end of each stroke of the slide in a way to take the power first from one pulley and then the other, which pulleys being driven in opposite directions shift the direction of movement of the mechanism including the slide, so as to reciprocate the same backward and forward and likewise alternately revolving the peg D' around the pegs of the slide in the operation of working or pulling the candy.

The modification shown in Fig. 11 is designed to cover a substitute construction for that shown in the preceding views, Figs. 9 and 10, and especially to take the place of the sprocket-wheels N and P and the chain O', which operates the third peg D'. This modified device, as illustrated, includes the gear K, loosely mounted upon the shaft K' in the same way as shown in Figs. 9, 10, and 11 and, further, embodies the arm T', link V', and segment W for operating the gear H' in the same way as in the other construction. In addition to said parts and upon the hub M' of the gear K is loosely hung a segmental rocker-arm X, which takes the place of the sprocket-wheels N and P, with their chain, and is adapted to be engaged on either side by pins X' of the gear K in a way to throw said arm to the right and left alternately and at a uniform rate of speed. This arm is bifurcated, as at Y, to straddle the shaft J and contains a segmental rack Y'. As will be seen, the teeth of this segmental rack Y' are laid out on a shorter radius than that described by the swing of the arm, so as to accommodate the eccentric gear Y'', mounted upon the shaft P'. The peripheral surfaces of this gear and segment are cut in this way to impart a variable movement to the shaft P' and the peg D' to transmit to said peg quick initial and final movements and a slow intermediate movement for each individual stroke of its arm, thus imparting the greatest power to said peg intermediate of its throw and when in engagement with the candy.

Having described the construction of my machine, I will now briefly describe the method of operation, which of course is continuous throughout the manipulation or working of a single piece of candy. From the construction previously described it will be clear that with each movement of the slide the clutch mechanism is automatically operated through the connections with the gear K in a manner to reverse the movement of said slide and the revolving arm. The candy being in a soft state is laid on one of the sliding pegs and the machine put into motion. The preliminary movement of course draws the candy across in line with the revolving peg, which engages the same, drawing it over its peg and holding it during the return of the slide, when it is drawn around the second peg. With each reciprocating movement of the slide thereafter the revolving peg alternately passes around the respective pegs of the slide as they are brought up in line with the center of axis of said revolving peg (see Figs. 2 to 4) in a way to engage the web of candy intermediate of its length, thus drawing and stretching it from each of the sliding pegs and winding such stretched and drawn portions around the outside of the particular peg adjacent thereto. The slide then returns to the other extreme of its movement, when the revolving arm again engages the candy intermediate of the pegs and draws and winds it around the other sliding peg in a way to stretch and harden the same. These manipulations are obviously repeated in quick succession, and if the web should break, as it sometimes does on machines of this sort, the revolving arm will quickly engage and pick up such broken ends and wind them around the respective pegs.

Having thus described my invention, what I claim, and desire to secure by Letters Patent, is—

1. In a candy-working machine, the combination with a frame, of a pair of pegs mounted upon a horizontal reciprocating slide, and a revolving peg adapted to alternately encircle the pegs of the slide.

2. In a candy-pulling machine, the combination with a frame, a driving mechanism, of a horizontal reciprocating slide and peg mounted adjacent to either end thereof, and a third peg revolubly mounted in the line of travel of said horizontally-reciprocating pegs.

3. In a candy-pulling machine, the combination with a suitable frame, of a slide horizontally mounted in said frame, means for reciprocating the same, a pair of pegs mounted upon the slide adapted to move horizontally therewith, a third peg revolubly mounted in the line of travel of the pegs of the slide and means for alternately revolving said third peg around the respective pegs of the slide.

4. In a candy-pulling machine the combination with two horizontally-moving pegs, of a revolving peg mounted in the line of travel of said first pegs, means for revolving said peg from left to right and right to left alternately around each of the horizontally-moving pegs respectively.

5. In a candy-working machine, the combination with a frame, of a pair of pegs, means for reciprocating the same horizontally, a third peg adapted to revolve around a center in line with the horizontal movement of the reciprocating pegs, and means for revolving said third peg around the reciprocating pegs alternately in opposite directions.

6. In a candy-working machine, the combination with a pair of pegs, of a horizontally-reciprocating slide, and a third peg and means to revolve the same alternately in opposite directions around the respective pegs of the slide.

7. In a candy-pulling machine, the combination with a revoluble peg adapted to move around a fixed center, a pair of pegs adapted to reciprocate backward and forward to and from the axis of movement of the revoluble peg in a way to alternately aline therewith and during the movement of said revolving peg.

8. In a candy-working machine, the combination with a frame, of a slide horizontally mounted therein, a pair of pegs horizontally mounted in the slide, means for reciprocating said slide, a third peg adapted to alternately revolve around the two pegs in the respective ends of the slide and connections from the driving mechanism of the slide for alternately revolving said third peg in opposite directions.

9. In a candy-pulling machine, the combination with a frame, of a slide bearing a pair of pegs horizontally mounted in the frame, means for reciprocating the slide, a third peg and means for revolving the same around the respective pegs of the slide when the same are brought into alinement with the center of axis of the movement of said third peg, and means for automatically reversing the movement of the mechanism whereby the slide and revolving peg are alternately thrown in opposite directions.

Signed at New Haven, in the county of New Haven and State of Connecticut, this 19th day of April, A. D. 1904.

GEORGE M. GRISWOLD.

Witnesses:
C. M. NEWMAN,
R. H. NEWMAN.